United States Patent [19]

Gosker

[11] Patent Number: 5,045,837
[45] Date of Patent: Sep. 3, 1991

[54] FUEL CUT-OFF ANTI-THEFT DEVICE

[75] Inventor: Brendan G. Gosker, Dublin, Ireland

[73] Assignee: Patrick Sheeran, Dublin, Ireland

[21] Appl. No.: 600,269

[22] Filed: Oct. 19, 1990

Related U.S. Application Data

[63] Continuation of Ser. No. 483,981, Feb. 23, 1990, abandoned, which is a continuation of Ser. No. 396,770, Aug. 21, 1989, abandoned, which is a continuation of Ser. No. 225,376, Jul. 28, 1988, abandoned.

[51] Int. Cl.$^5$ .......................... B60Q 1/00; B60R 25/00
[52] U.S. Cl. .................... 340/450.2; 340/426; 307/9.1; 307/10.1; 307/10.2; 307/10.4; 180/173; 180/287
[58] Field of Search ............................. 340/450.2, 426; 307/10.1, 9.1, 10.2, 10.3, 10.4; 180/173, 277, 279, 284, 287

[56] References Cited

U.S. PATENT DOCUMENTS 3,670,836  6/1972  Tonkowich et al. .
3,754,148  8/1973  Nye .
3,756,341  9/1973  Tonkowich et al. .
3,834,484  9/1974  Sangster .

FOREIGN PATENT DOCUMENTS 2550499  2/1985  France .
2562012  10/1985  France .

Primary Examiner—Donnie L. Crosland
Attorney, Agent, or Firm—Fleit, Jacobson, Cohn, Price, Holman & Stern

[57] ABSTRACT

A fuel cut-off anti-theft device for a vehicle having a fuel control valve (1) for mounting in a vehicle fuel line (2), and a control device for operating the valve (1) including a local control device (10) formed by an electronic circuit (15) mounted to the valve body and a remote keypad (12) through which the user inputs a coded sequence of input signals to operate the valve (1). The electronic circuit (15) and the body of the valve are encapsulated in an epoxy resin compound to prevent tampering with the valve body and/or circuit (15).

7 Claims, 4 Drawing Sheets

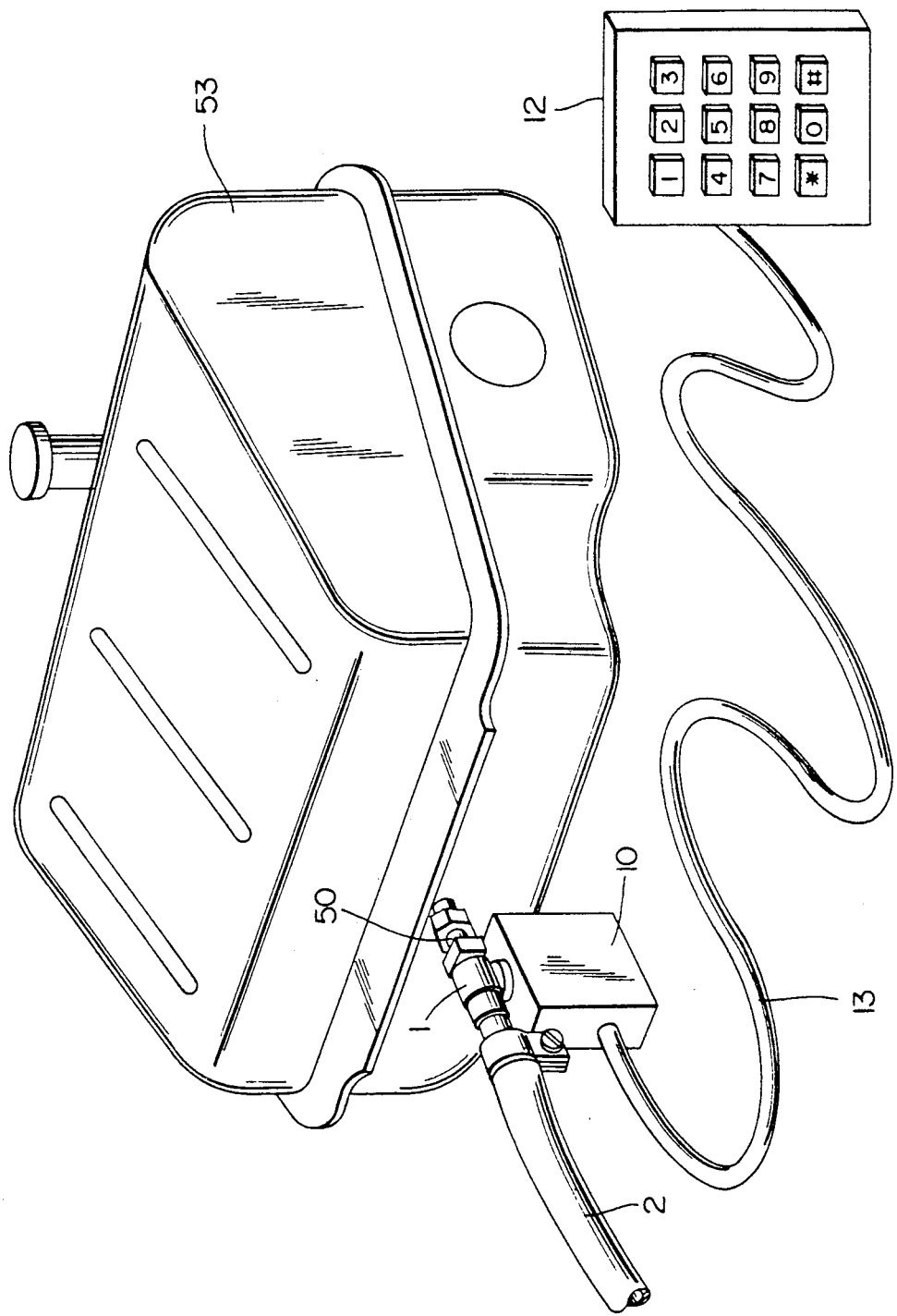

FUEL CUT-OFF ANTI-THEFT DEVICE

This application is a continuation of application Ser. No. 07/483,981, filed Feb. 23, 1990, abandoned, which is a continuation of application Ser. No. 07/396,770, filed Aug. 21, 1989, abandoned, which is a continuation of application Ser. No. 07/225,376 filed July 28, 1988 abandoned.

BACKGROUND OF THE INVENTION

The invention relates to a fuel cut-off anti-theft device for a vehicle.

Many fuel cut-off anti-theft devices of the type comprising a fuel control valve which has an operating means for moving the valve between an open and a closed position and control means for operating the valve are known. In conventional arrangements the control means and/or the valve can be relatively easily tampered with to allow the thief to open the valve and allow flow of fuel.

One such device is described in French Patent Specification No. 2562012 (Wittver). Wittver describes a fuel cut-off anti-theft device comprising an electric solenoid valve, an electronic circuit, a relay center and a keypad. A DC signal from the keypad is outputted along a line to the relay center which, provided the carried signal is received, converts the DC signal into an AC signal which is outputted along another line to the electronic circuit where the signal from the relay center is converted back into a DC signal to operate the solenoid valve. The solenoid valve is mounted on the fuel line. The relay center however, is situated in the dashboard of the vehicle. In the Wittver system either of the lines from the keypad to the relay center or from the relay center to the control circuitry are readily accessible and can be successfully interfered with. Indeed, Wittver admits that a separate alarm would be required if the line from the keypad to the relay were tampered with.

U.S. Pat. No. 3,756,341 (Tonkowich) describes a keypad operated fuel cut-off anti-theft device, however, the unit may be easily tampered with as the control circuitry for the valve is readily accessible.

French Patent Specification No. 2550499 (Bayard) also describes a fuel cut-off anti-theft device however, there are no worthwhile tamper proofing measures proposed as the supply breaker is merely hidden in the dashboard.

There is therefore, a need for an improved cut-off anti-theft device for a vehicle.

BRIEF SUMMARY OF THE INVENTION

The object of this invention is to provide such an improved device which will be very difficult for a thief to tamper with.

According to the invention there is provided a fuel cut-off anti-theft device for a vehicle comprising:
a fuel control valve having a valve inlet and a valve outlet,
the valve having an operating means for moving the valve between an open and a closed position,
control means for the operating means,
the control means comprising a local valve control device and a remote input means,
the local valve control device comprising all the control operating circuitry for the valve,
the local valve control device being mounted to the valve, and
tamper-proof means to prevent tampering with the control device.

In one embodiment of the invention the local valve control device comprises an input decoding, or data verification, device and a relay for operating the valve in response to a signal from the decoding device. Preferably the input decoding device is an integrated circuit sequence detector which is powered through a voltage regulator in association with a time delay device.

In a preferred embodiment of the invention the input means comprises a remote keypad. Preferably the keypad is directly connected to the control device by a cable along which an input signal from the keypad is delivered. In a preferred embodiment of the invention the tamperproof means comprises an encapsulating or potting compound enclosing the local valve control device and at least part of the fuel control valve. Preferably the potting compound is brittle on setting.

In one case the valve inlet means includes mounting means for mounting the valve to the outlet of a fuel tank. In another case the valve inlet includes mounting means for mounting the valve to the inlet or outlet of a fuel filter.

BRIEF DESCRIPTION OF THE DRAWINGS

The invention will be more clearly understood from the following description of an embodiment thereof given by way of example only with reference to the accompanying drawings wherein:

FIG. 5 a perspective view of the anti-theft device in another position of use.

DETAILED DESCRIPTION

Figure 1:
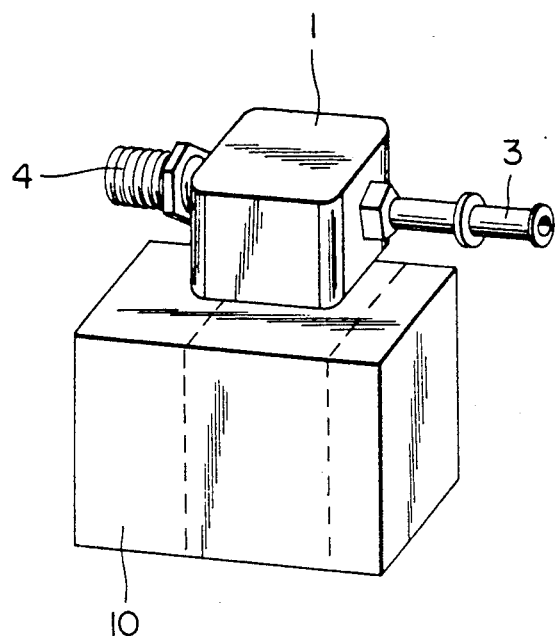
FIG. 1 is a perspective view of portion of an anti-theft device according to the invention.
Figure 2:
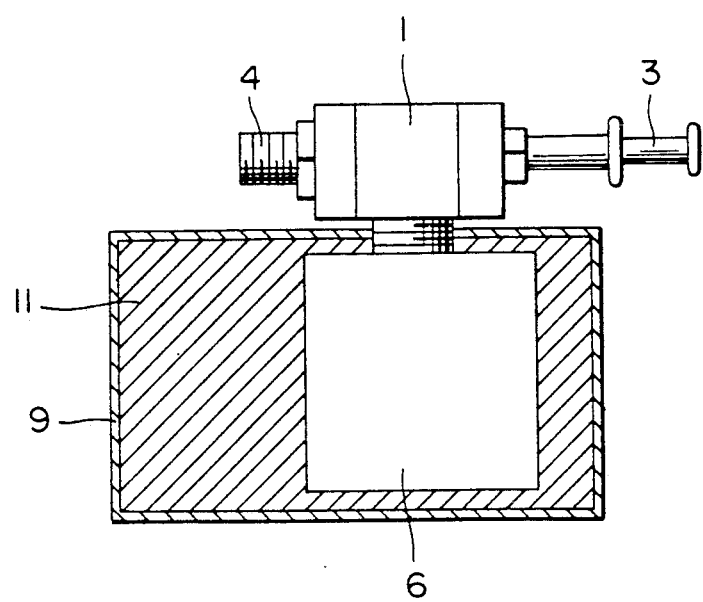
FIG. 2 is a front elevational partially cross-sectional view of the device of FIG. 1.
Figure 3:
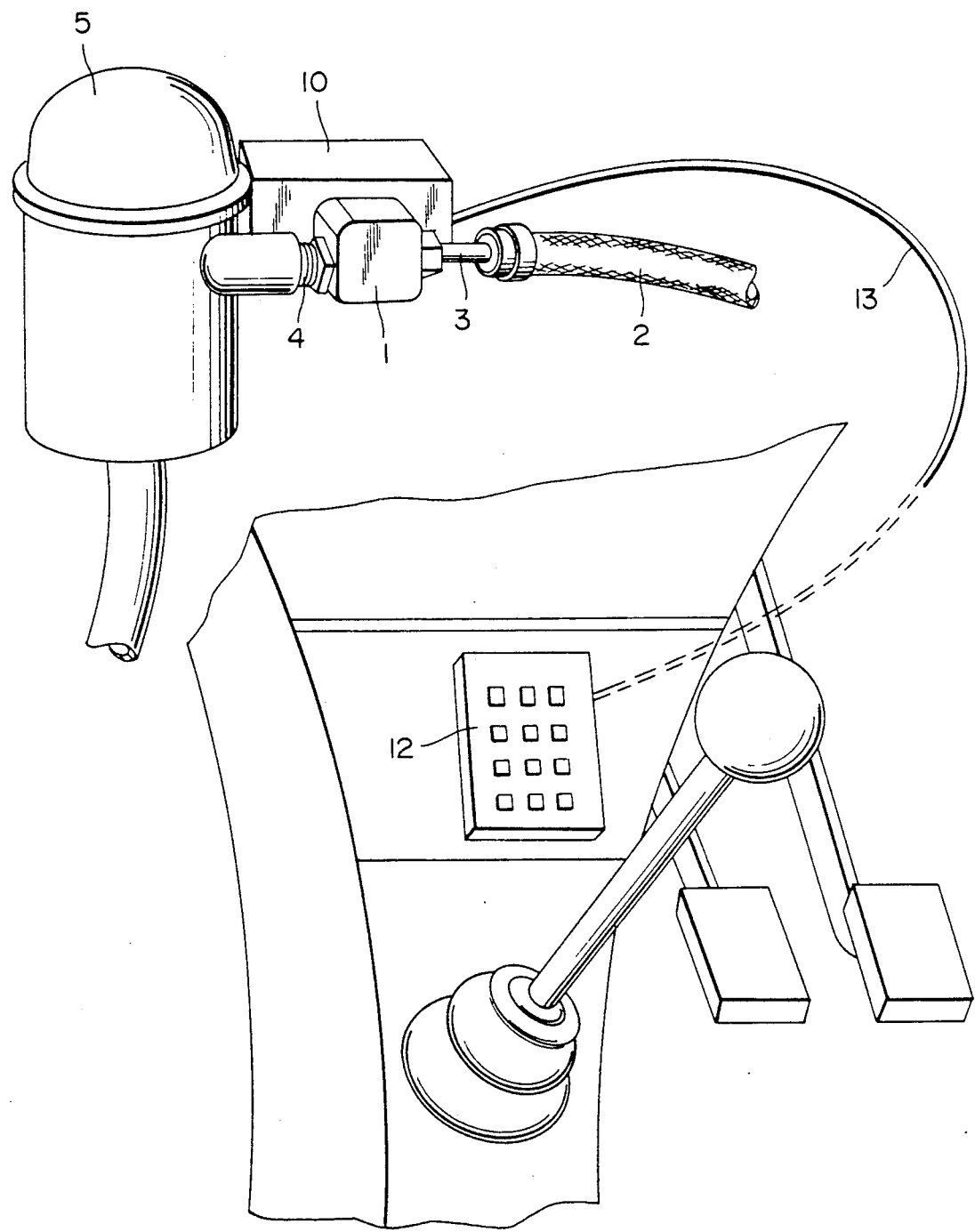
FIG. 3 is a perspective view of the anti-theft device in use.

Referring to the drawings and initially to FIGS. 1 to 4 thereof there is illustrated a fuel cut-off anti-theft device for a vehicle comprising a fuel control valve 1 for mounting in a vehicle fuel line 2. In this case, the valve includes an inlet spigot 3 to which the fuel line 2 is attached and an outlet spigot 4 which is screwed to the carburetor or filter 5 on the vehicle fuel line. The valve 1 is of conventional construction and includes operating means housed within the valve body 6 for moving the valve between an open position in which fuel from the fuel line 2 is allowed to pass, to a closed position in which the flow of fuel through the fuel line is shut off. Control means for the operating means comprises a local control device 10 which is mounted adjacent the valve 1 and in this case is attached to it, the valve body 6 shielding the local control device 10 and vice versa against tampering. The control means also comprises a remote control signal input means, in this case, a keypad 12 which is usually mounted within the vehicle, for example, on the dashboard as illustrated in FIG. 3 and is connected to the control device 10 by a multi-core cable 13.

Figure 4:
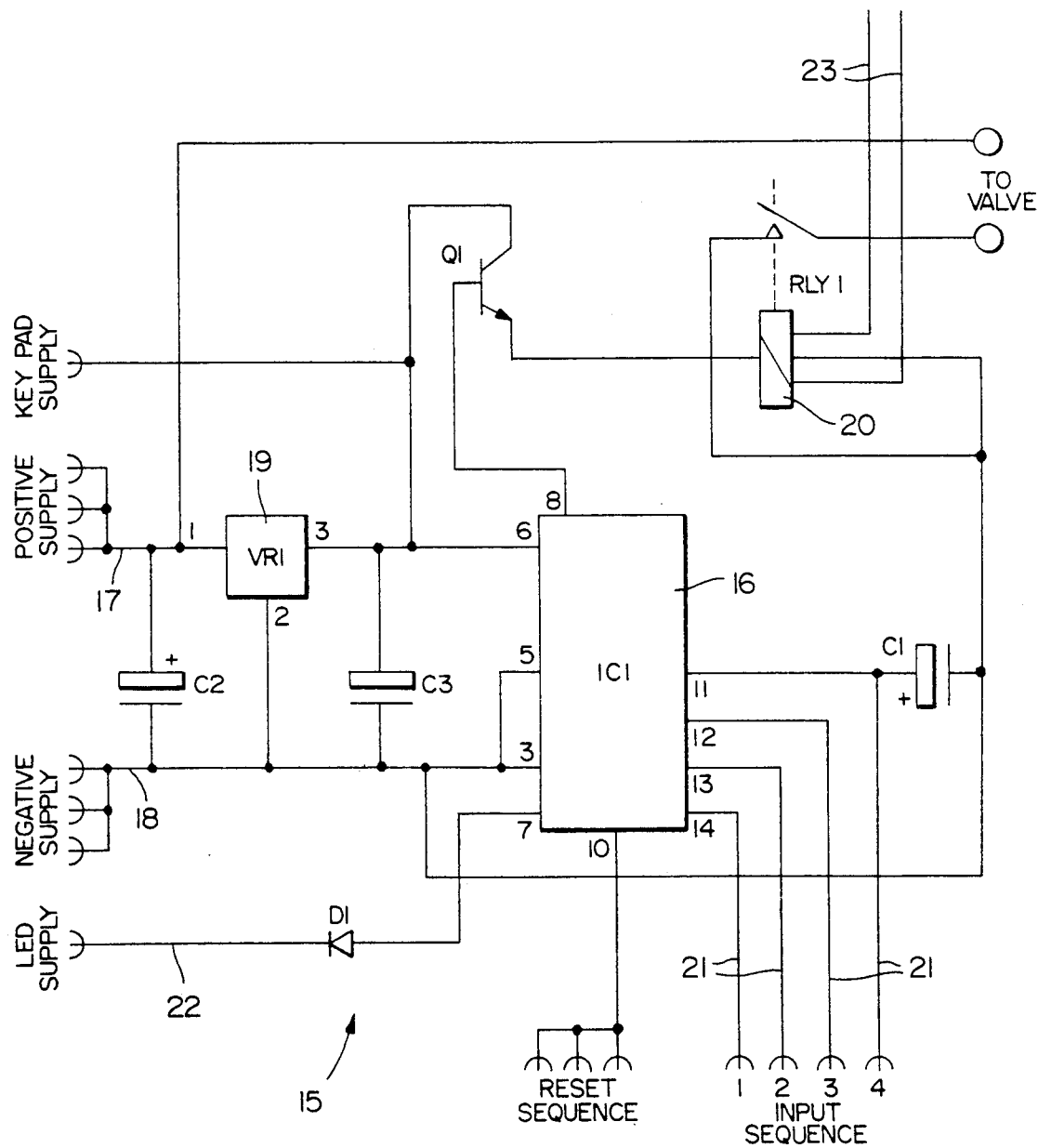
FIG. 4 is a schematic circuit diagram of a portion of the device of the invention.

The local control device 10 includes an electronic circuit 15 which is illustrated schematically in FIG. 4. The circuit 15 comprises an integrated circuit sequence detector 16 or data verification powered by an input 12 V DC supply through positive and negative inputs 17, 18, respectively, through a 12 volt voltage regulator 19 and associated noise filtering capacitors C2 (0.33 μF) and C3 (47 μF). The valve is operated by a relay 20 which is activated from the sequence detector 16 through a transistor Q1. Input signals from the keypad are fed to the sequence detector 16 along input lines 21. A time delay capacitor C1 (2.2 μF) provides a preset time within which the user must input the correct code at the keypad to operate the valve. A diode D1 is provided on a keypad LED supply line 22 to prevent power being inputted to the sequence detector 16 on the LED supply line. The relay 20 may also be used to activate an ignition coil circuit breaker along circuit breaker output lines 23.

The sequence detector 16 decodes the input signals and outputs a trigger output signal to the relay 20 in accordance with the instructions pre-programmed into the integrated circuit. The instruction to open and close the valve 1, preferably comprises a coded sequence of inputs which must be inputted through the keypad within a preset time limit. If the input sequence corresponds to the preprogrammed sequence on the integrated circuit 16, a trigger output signal is outputted to operate the relay 20 and open the valve 1. In the event that the input signal is not the same as the inputs preprogrammed at manufacturing stage into the integrated circuit, no output is delivered on the trigger output line and the valve 1 will remain closed.

To prevent tampering, the electronic circuit 15, and in this case also the valve body are mounted in a potting box 9 and encapsulated with a flame retardant epoxy resin compound to form an encapsulated mass 11 which becomes brittle on setting. Thus, it would be extremely difficult if not impossible for a thief to tamper with the circuit. In addition to protecting the electronic circuit 15, the encapsulation of the circuit and valve body also protects the valve operating means against tampering.

Referring to FIG. 5 the fuel cut-off anti-theft device according to the invention is illustrated mounted in another configuration in which parts similar to those identified above with reference to FIGS. 1 to 4 are assigned the same reference numerals. In this case the valve inlet is provided with a mounting mean 50 for mounting the anti-theft device directly to the outlet of a fuel tank 53. Other details of the anti-theft device are as described above with reference to FIGS. 1 to 4. The advantage of positioning the anti-theft device at the outlet from the fuel tank is in allowing the fuel to be cut-off at the source further limiting the possibilities for tampering with the fuel line. Generally the fuel tank is positioned in a vehicle in a relatively inaccessible location.

The invention provides an anti-theft device which is extremely difficult if not impossible, to tamper with. Only the input keypad is positioned in the car and the valve cannot be opened by the keypad without using the correct input sequence. In the event that the cable between the keypad and the electronic circuit is cut, the valve still remains closed. Any attempt to interfere with the electronic circuit by trying to break the resin will more than likely result in damage to the circuit and again the valve will remain closed.

It will be appreciated that while a particular type of fuel control valve has been illustrated and described, any suitable control valve may be employed. For example, although it is advantageous from the point of view of increasing the tamper-proof aspects of the anti-theft device to mount the control valve adjacent to the carburetor, it may be mounted in any other convenient location, for example, in the fuel line or possibly to make access even more difficult in the fuel tank. A further advantage of such an arrangement is in allowing the fuel to be cut off at the source in the event of an accident to help prevent possible combustion, fire and/or explosion. Thus, impact detection means may be provided to operate the relay to close the valve in the event of an accident. The valve may also be formed integrally with the vehicle carburetor. In engines which do not include a carburetor the device may be mounted in any convenient location in the fuel line.

It will also be appreciated that the anti-theft device according to the invention may be linked to or associated with any other suitable anti-theft device and may, for example, provide an output signal to an audible or visual alarm, or may be linked with such a system.

It will further be appreciated that any coded signal may be used to operate the fuel control valve. Where the coded signal is inputted through a keypad the code is preferably at least a two digit code and most preferably at least a four digit code to prevent accidental shut-off of the valve.

It will be appreciated that the inlet or outlet of the valve may be threaded to receive adaptors for mounting the unit to a carburetor, filter or to the outlet of a fuel tank. When fitted, the adaptor may be fixed in position by, for example, spot welding.

I claim:

1. A fuel cut-off anti-theft device for a vehicle having a fuel tank and a fuel line connected to the fuel tank comprising:
   an electrically operated fuel control valve connected in the fuel line having a valve inlet and a valve outlet;
   valve operating means for moving said fuel control valve between an open position for allowing fuel flow through the fuel line and a closed position for cutting off said fuel flow;
   electrical control means for controlling the operation of said valve operating means, said control means comprising a local control device, a remote command input means, and an electrical conducting cable interconnecting said remote command input means and said local control device, said remote command input means outputting a data signal to said local control device via said cable;
   said local control device being operatively connected to said fuel control valve and an electric power source and comprising data verification means for verifying said data signal from said remote command input means and valve enabling means for said fuel control valve; and
   tamper-proof means comprising an encapsulating compound enclosing said local control device and at least a portion of said fuel control valve to prevent tampering with said fuel control valve and said local control device.

2. A fuel cut-off anti-theft device as claimed in claim 1 wherein said valve operating means comprises a relay connected to said local control device for operating said valve in response to a signal from said data verification means.

3. A fuel cut-off anti-theft device as claimed in claim 2 wherein said data verification means comprises:
   an integrated circuit sequence detector;
   a voltage regulator operatively connected in said circuitry for powering said sequence detector; and a time delay device operatively connected in said circuitry for providing a preset time in which said remote command input means must be operated.

4. A fuel cut-off anti-theft device as claimed in claim 1 wherein said remote command input means comprises a remote keypad.

5. A fuel cut-off anti-theft device as claimed in claim 1 wherein said encapsulating compound comprises an epoxy resin which becomes brittle on setting.

6. A fuel cut-off anti-theft device as claimed in claim 1 wherein said valve inlet comprises mounting means for mounting said fuel control valve to the outlet of the fuel tank.

7. A fuel cut-off anti-theft device as claimed in claim 1 wherein a fuel filter having an inlet and an outlet is connected in the fuel line and said valve inlet comprises mounting means for mounting said fuel control valve to one of said inlet and outlet of said fuel filter.

* * * * *